May 25, 1948. H. R. LEGATSKI 2,442,011
PRODUCTION OF SOLVENTS
Filed Sept. 3, 1946
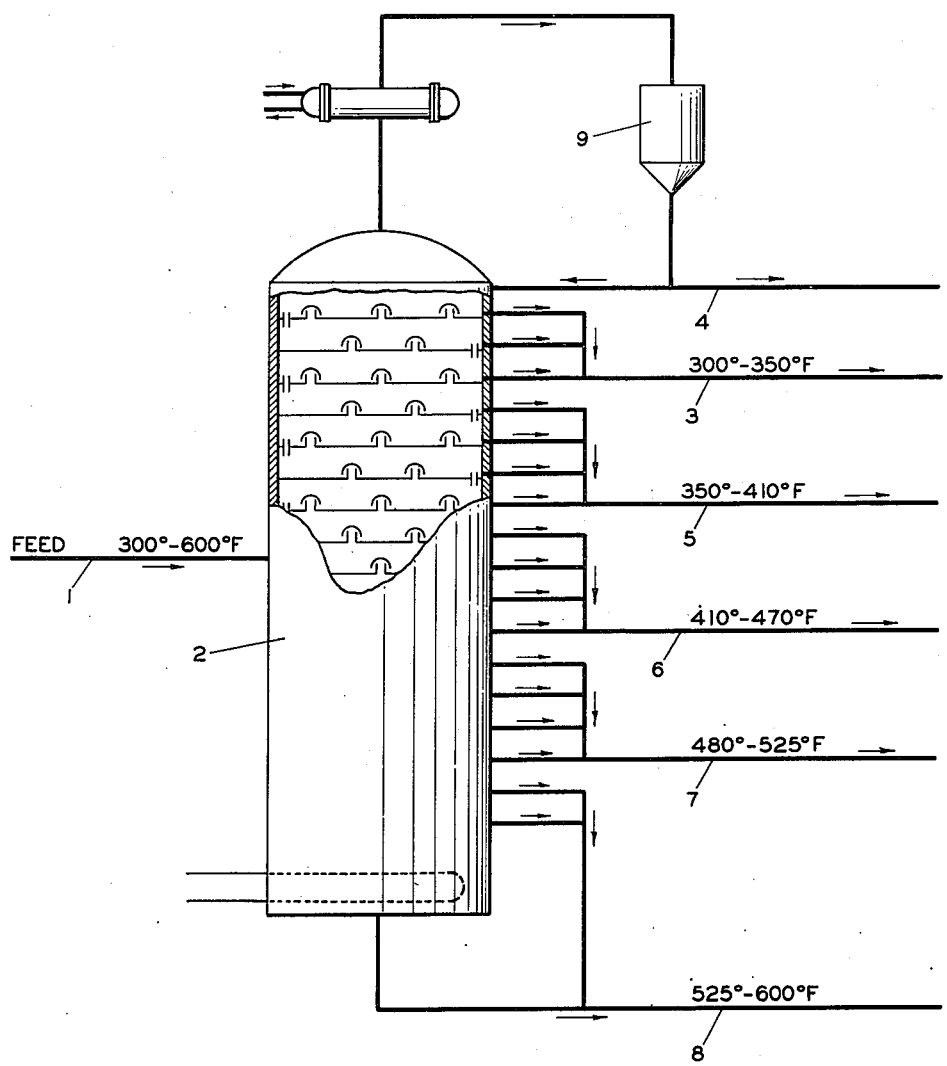
INVENTOR.
H. R. LEGATSKI
BY
*Hudson and Young*
ATTORNEYS Patented May 25, 1948

2,442,011

UNITED STATES PATENT OFFICE 2,442,011

PRODUCTION OF SOLVENTS

Harold R. Legatski, Bartlesville, Okla., assignor to Phillips Petroleum Company, a corporation of Delaware Application September 3, 1946, Serial No. 694,542

4 Claims. (Cl. 196—94)

This invention relates to improvements in methods for producing hydrocarbon fractions having desired boiling range. In one particular aspect it relates to improvements in methods for producing substantially odorless fractions of branched chain paraffin hydrocarbons having desired boiling range.

Highly branched paraffin hydrocarbons are most commonly made by catalytic alkylation of olefins with low-boiling isoparaffins in the presence of a suitable catalyst such as substantially anhydrous hydrofluoric acid, concentrated sulfuric acid or aluminum halide-hydrocarbon complex catalyst activated with hydrogen halide. The latter type of catalyst is used extensively in the alkylation of isobutane with ethylene to give diisopropyl as a principal reaction product. The copending application of Clarence R. Ringham, Serial Number 556,208, filed September 28, 1944, which issued October 15, 1946, as Patent No. 2,409,389, shows a method of preparing diisopropyl in this manner.

The present invention is highly useful when operated in conjunction with an alkylation process for producing highly branched paraffin hydrocarbons but it is not limited to such use. It is especially effective when applied to mixtures of branched chain paraffins derived from any source whatever.

The principal use for highly branched paraffin hydrocarbons has been in the production of high octane motor fuels. In processes for the manufacture of such alkylates for motor fuel considerable quantities of highly branched paraffin hydrocarbons which have boiling ranges overlapping and above the motor fuel range are obtained as by-products.

An obvious method of utilizing such by-products would be to employ them as solvents, but when it is attempted to fractionally distill these by-products to recover fractions of suitable boiling range it is found that all fractions of highly branched paraffin hydrocarbons obtained by conventional processes of distillation have odors which make them unfit for many commercial uses.

The synthetic branched-chain paraffin hydrocarbons made by catalytic processes such as alkylation or polymerization of olefins followed by hydrogenation are hydrocarbons having characteristically very low odor intensity. It is common practice in the manufacture of these compounds to subject the feed stocks to a very high degree of purification. Such purification of feed stocks also results in synthetic hydrocarbon products which are almost entirely free from sulfur, nitrogen, oxidized products and other contaminants.

When the products resulting from catalytic alkylation processes for the production of high octane motor fuel are distilled to remove alkylates boiling in the motor fuel range a mixture of high-boiling alkylates is recovered as a kettle product. This by-product is practically odorless when recovered but it slowly develops a disagreeable, rancid odor on aging or immediately develops such odor when boiled. When fractions of any desired boiling range are distilled from this fresh, odorless mixture the resulting distillates are found to have rancid odors which make them unfit for use in many industrial applications. This is true whether the distillation is performed batchwise or continuously; at atmospheric pressure, with steam or without.

The highly branched paraffin hydrocarbons exhibit this behavior generally and it is not limited to kettle products from alkylation processes. The reactions by which odorous compounds are formed during boiling, distillation or aging are not understood completely, but it is believed that the presence of large numbers of second and/or tertiary carbon atoms is a principal factor contributing to odor development. It is known that olefin formation is not a principal cause of odor development in such materials because the bromine number of the hydrocarbon material is not increased by distillation.

Materials composed essentially of branched chain paraffin hydrocarbons of proper boiling range have solvent power suitable for use in the paint, dry cleaning, printer's ink and insecticide industries, but solvent odor are objectional in all these, and are especially objectionable in the dry cleaning, paint and insecticide industries. To be saleable to those industries a solvent must not only have the required solvent properties but must be able to compete successfully with deodorized straight run naphthas on the basis of odor alone.

Numerous unsuccessful attempts to remove the odor from fractions of branched chain hydrocarbon materials have been made. Processes of blowing a fraction of distillate with air, with nitrogen, with carbon dioxide, extracting distillate with alkali, refluxing distillate with solid caustic, and percolating distillate through fuller's earth or other suitable clay have been tried without success. The first successful methods of producing odorless fractions of branched chain paraffin hydrocarbons are taught in copending applications of Legatski and Crawford, Serial No. 616,930, filed September 17, 1945, and Crawford and Morris, Serial No. 617,870, filed September 21, 1945. Both applications teach the production of odorless fractions of such materials by special distillation procedures. The distillation procedures taught in both applications are effective but are rather cumbersome since they involve either gas blanketing of all distillation steps or require multiple fractionations to obtain the desired product, involving commercially much pumping, heating and cooling of materials. A more convenient method of preparing fractions of branched chain paraffin hydrocarbons having desired boiling range is a very desirable improvement in the art.

It is an object of this invention to provide an improved method for producing a substantially odorless fraction of branched chain paraffin hydrocarbons having definite boiling range.

Another object is to provide a method of producing a plurality of substantially odorless fractions of branched chain paraffin hydrocarbons using a single fractionating column.

Another object is to provide an improved method of eliminating odorous materials from branched chain paraffin hydrocarbons.

Another object is to provide a method for preparing a plurality of successive substantially odorless narrow boiling fractions from a mixture of branched chain paraffins which is cheap, convenient and easy to operate.

Another object is to provide an improved method of preparing a plurality of narrow boiling fractions from a mixture of hydrocarbons using a single fractionating tower.

Further objects and advantages of my invention will be apparent from the following description thereof taken in connection with the accompanying drawing showing diagrammatically one particular system for carrying out my invention.

I have found that odorous materials present in a branched chain paraffin feed to a fractionation column or formed in such materials during distillation thereof may be eliminated and substantially odorless fractions may be obtained by distilling branched chain paraffin hydrocarbons in a particular manner hereinafter described.

For convenience only my invention will be described in connection with a feed composed of heavy alkylates. Boiling ranges of feed and fractions of product are chosen arbitrarily for purposes of illustration only. It is well within the skill of the art to make any changes desired in boiling range of fractions of product, as for instance by changing the boiling range of feed, drawing such fractions from a greater or lesser number of consecutive plates, etc.

Referring to the drawing, a feed composed essentially of mixed heavy alkylates having a boiling range of from 300° to 600° F. is fed via line 1 in to a plate type fractionating column 2. Column 2 has, preferably, many plates and large capacity, although, less conveniently, a small column having few plates may be used.

During such introduction of feed column 2 is operated under total reflux conditions, i. e. with return of all overhead condensate as reflux and without production of a kettle product. Introduction of feed is continued until flooding of the plates of the column becomes imminent. Introduction of feed is then discontinued and operation of the column under total reflux conditions is continued until equilibrium between fluid on the various plates of the column and vapors in contact therewith is substantially attained.

I have found that odorous materials present in a highly branched paraffin feed or formed in such material during distillation are substantially all present in the liquid on the uppermost plates of a fractionating column when the process described above is complete. The reason for this behavior is not obvious as the exact nature of the odorous materials is not completely understood. I believe, however, that the formation of odorous materials occurs only when there is free oxygen present, either as dissolved oxygen in the feed stream or as residual oxygen from air originally present in the distillation column. It is probable that the odorous materials formed either contain oxygen or are formed by reactions which are initiated by oxygen and that such odorous products have slightly greater volatility than the hydrocarbons from which such compounds are derived. This is a purely theoretical attempt to explain the behavior of such odorous materials and my invention is not to be understood as limited to any theory or mechanism of chemical action. I have found that such odorous materials are substantially all contained in the fluid on the uppermost few plates of the fractionation column when the distillation is conducted as described above; and that fluid on the lower plates is substantially odorless.

After distillation under total reflux conditions has continued until equilibrium is substantially attained, liquid from the uppermost few trays is drained via line 3 and is discarded. Any condensate in reflux accumulator is also withdrawn via line 4 and is discarded.

Substantially odorless fractions of desired boiling range are then withdrawn by draining successive lower groups of plates via lines 5, 6, 7 and 8. When the column has been emptied, feed is again introduced via line 1 and the process of charging under total reflux until plates are filled, discontinuing charging, and continuing total reflux until equilibrium is substantially attained is repeated. A batch, or semi-batch type of operation results.

The novel distillation used in my process is especially useful in the preparation of substantially odorless fractions of highly branched paraffin hydrocarbons. It is also a very desirable method for separating other hydrocarbon mixtures into fractions of desired boiling range especially useful when the material to be distilled yields an undesirable product in the presence of oxygen at distillation temperatures. By the use of my method of distillation air originally present in the fractionation column is substantially all driven out by vapors while the feed is being introduced and undesirable products formed in the presence of oxygen may be concentrated in a narrow boiling fraction collected on a few plates of the column.

This method of distillation can easily be controlled by conventional time-cycle devices, thus obtaining many of the advantages of continuous-type operation. It is only necessary to observe the original time and rate of flow required to fill the column, the time, pressure and temperature conditions for the materials in the column to substantially attain equilibrium and the time and rates of flow required for draining the plates of finished and discarded products in order to have the data necessary for proper setting of instruments controlling such equipment.

*Example*

A heavy alkylate fraction received at a refinery has an API gravity of 50.9° and the following distillation characteristics:

| | |
|---|---|
| Initial boiling point _____ °F__ | 43 |
| 10% _____ | 378 |
| 50% _____ | 398 |
| 95% _____ | 570 |
| End point_____ | 597 |

This alkylate is employed as feed to a conventional plate type fractionation column having 20 plates of large liquid capacity. During introduction of this feed the column is operated under total reflux conditions. When flooding of the plates of the column is imminent introduction of feed is discontinued and operation of the column under total reflux is continued until equilibrium between liquid on the various plates and vapors in contact is substantially attained.

Observation of liquid on the various plates of the column shows concentration of odorous materials on the uppermost plates of the column. The liquid on the 20th (top) plate is strongly odorous. There is a noticeable odor gradient between the 20th and 19th plates and substantially all odor is absent from plates below the 17th.

The liquid present in the column below the 17th plate is so nearly odorless that distilled water must be used as a standard for comparison.

The odorless fractions desired are those boiling in the ranges from 390° to 430° F. and 430° to 597° F. These are obtained by draining selected plates of the column below the 17th plate. Liquid is drained from the 17th to 20th plates and discarded.

Time cycle devices are set to control admission of feed, operation of the column under total reflux conditions with plates filled and withdrawal of products from selected plates of the column. Operation is continued under semi-batch type functioning until feed having the characteristics of the original feed is no longer obtainable.

I claim:

1. A process of producing a substantially odorless fraction of branched chain paraffin hydrocarbons having desired boiling range which comprises: introducing a feed stream of branched chain paraffin hydrocarbons into a plate type fractionating column; operating said fractionatin column under total reflux conditions during such introduction of feed stream; discontinuing introduction of feed stream when flooding of the plates of said column is imminent; continuing operation of said column under total reflux until equilibrium between liquid on the various plates of said column and vapors in contact therewith is substantially attained; and withdrawing a substantially odorless fraction of desired boiling range from selected plates of said column.

2. A process of producing a plurality of substantially odorless fractions of branched chain paraffin hydrocarbons having desired boiling range which comprises: introducing a feed stream of branched chain paraffin hydrocarbons into a plate type fractionating column; operating said fractionating column under total reflux conditions during such introduction of feed stream; discontinuing introduction of feed stream when flooding of the plates of said column is imminent; continuing operation of said column under total reflux until equilibrium between liquid on the various plates of said column and vapors in contact therewith is substantially attained; and withdrawing substantially odorless fractions of desired boiling range from selected portions of said column.

3. A process of producing a plurality of substantially odorless fractions of branched chain paraffin hydrocarbons having desired boiling range which comprises: introducing a feed stream of branched chain paraffin hydrocarbons into a plate type fractionating column; operating said column under total reflux conditions during such introduction of feed stream; discontinuing introduction of feed stream when flooding of the plates of said column is imminent; continuing operation of said column under total reflux until equilibrium between liquid on the various plates of said column and vapors in contact therewith is substantially attained; subsequently withdrawing an odorous fraction of hydrocarbon material from the uppermost portion of said column; and withdrawing odorless fractions of desired boiling range from lower selected portions of said column.

4. A method of producing a plurality of substantially odorless fractions of branched chain paraffin hydrocarbons having desired boiling range which comprises: introducing a feed stream composed essentially of branched chain paraffin hydrocarbons into a plate type fractionation column; operating said column under total reflux conditions during such introduction of feed stream; discontinuing introduction of feed stream when flooding of the plates of said column is imminent; continuing operation of said column under total reflux until equilibrium between liquid on the various plates of said column and vapors in contact therewith is substantially attained; subsequently withdrawing and discarding the liquid present on the plates in the uppermost portion of said column as an odorous fraction; withdrawing liquid present in all lower portions of said column as substantially odorless fractions of desired boiling range, thereby substantially emptying said column; resuming introduction of feed stream under total reflux and repeating the process.

HAROLD R. LEGATSKI.

REFERENCES CITED

The following references are of record in the file of this patent:

UNITED STATES PATENTS

| Number | Name | Date |
| --- | --- | --- |
| 2,054,777 | Ward | Sept. 15, 1936 |
| 2,360,050 | Chadder | Dec. 12, 1944 |
| 2,365,051 | Chadder | Dec. 12, 1944 |
| 2,405,393 | Atkins | Aug. 6, 1946 |